Dec. 11, 1934.　　　　L. C. SHIPPY　　　　1,983,781
CONTROL OF ARC WELDER HEAD
Filed June 20, 1932　　　4 Sheets-Sheet 1
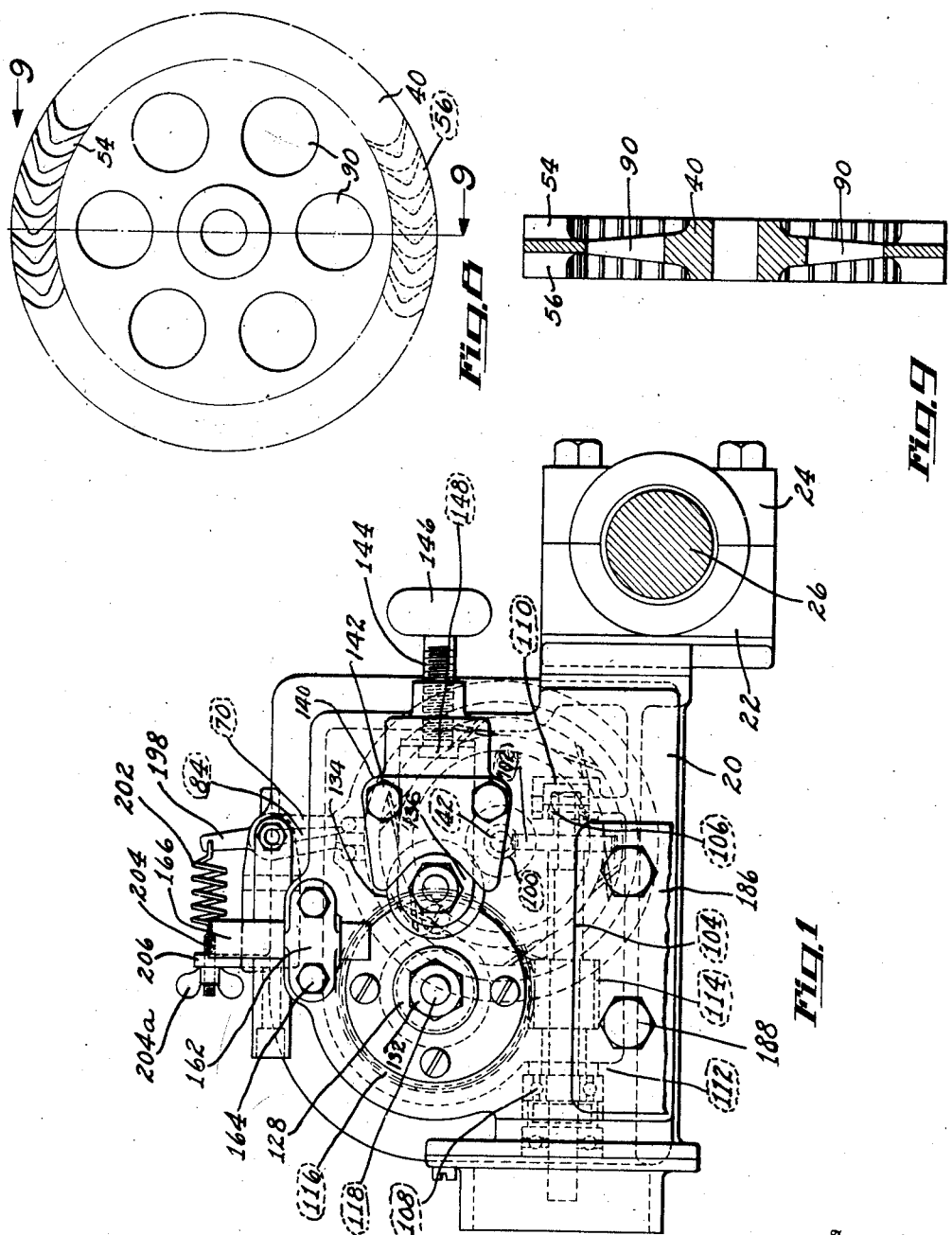
Inventor
Leo C. Shippy
By Spencer Hardman and Fehr
his Attorneys

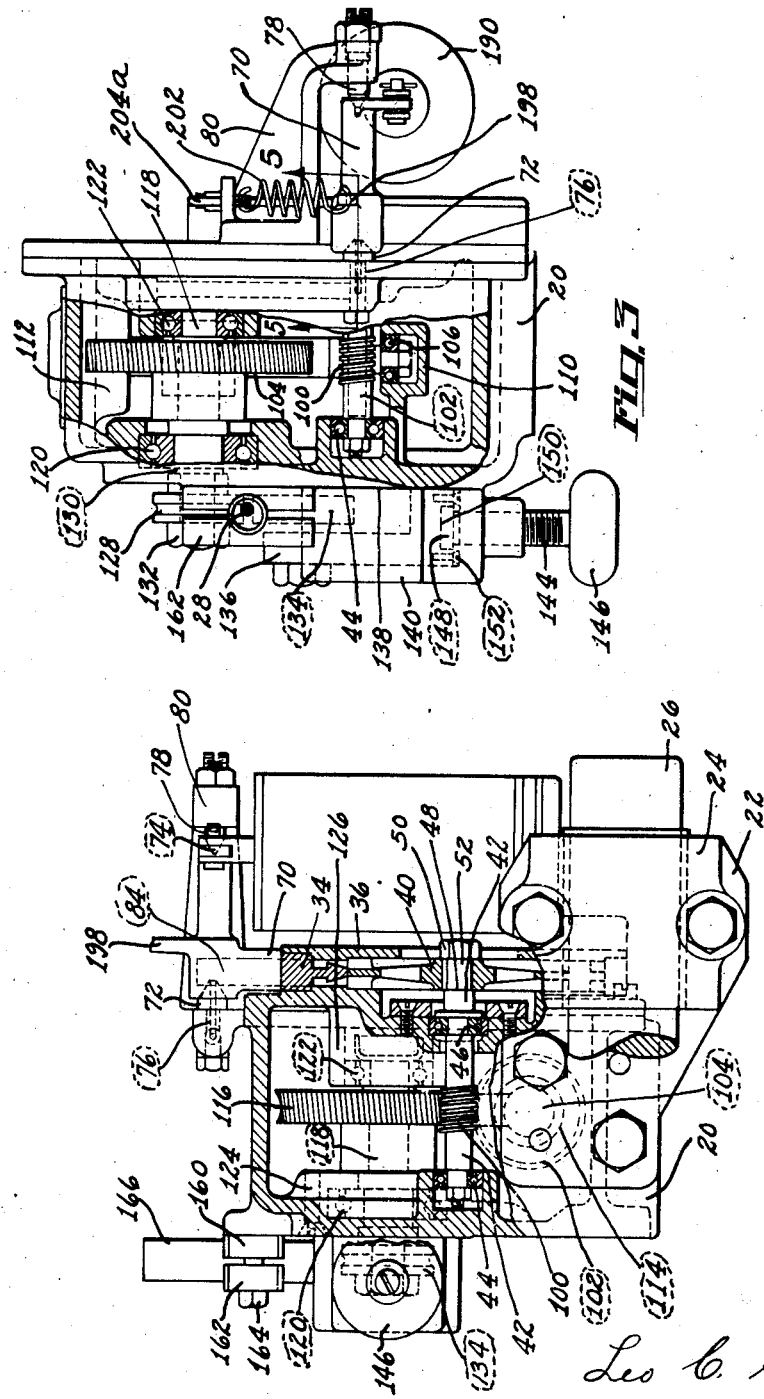

Dec. 11, 1934.                L. C. SHIPPY                1,983,781
                       CONTROL OF ARC WELDER HEAD
                       Filed June 20, 1932    4 Sheets-Sheet 3

Inventor
Leo C. Shippy
By Spencer Hardman and Fehr
his Attorneys

Dec. 11, 1934.                L. C. SHIPPY                1,983,781
                      CONTROL OF ARC WELDER HEAD
                      Filed June 20, 1932        4 Sheets-Sheet 4
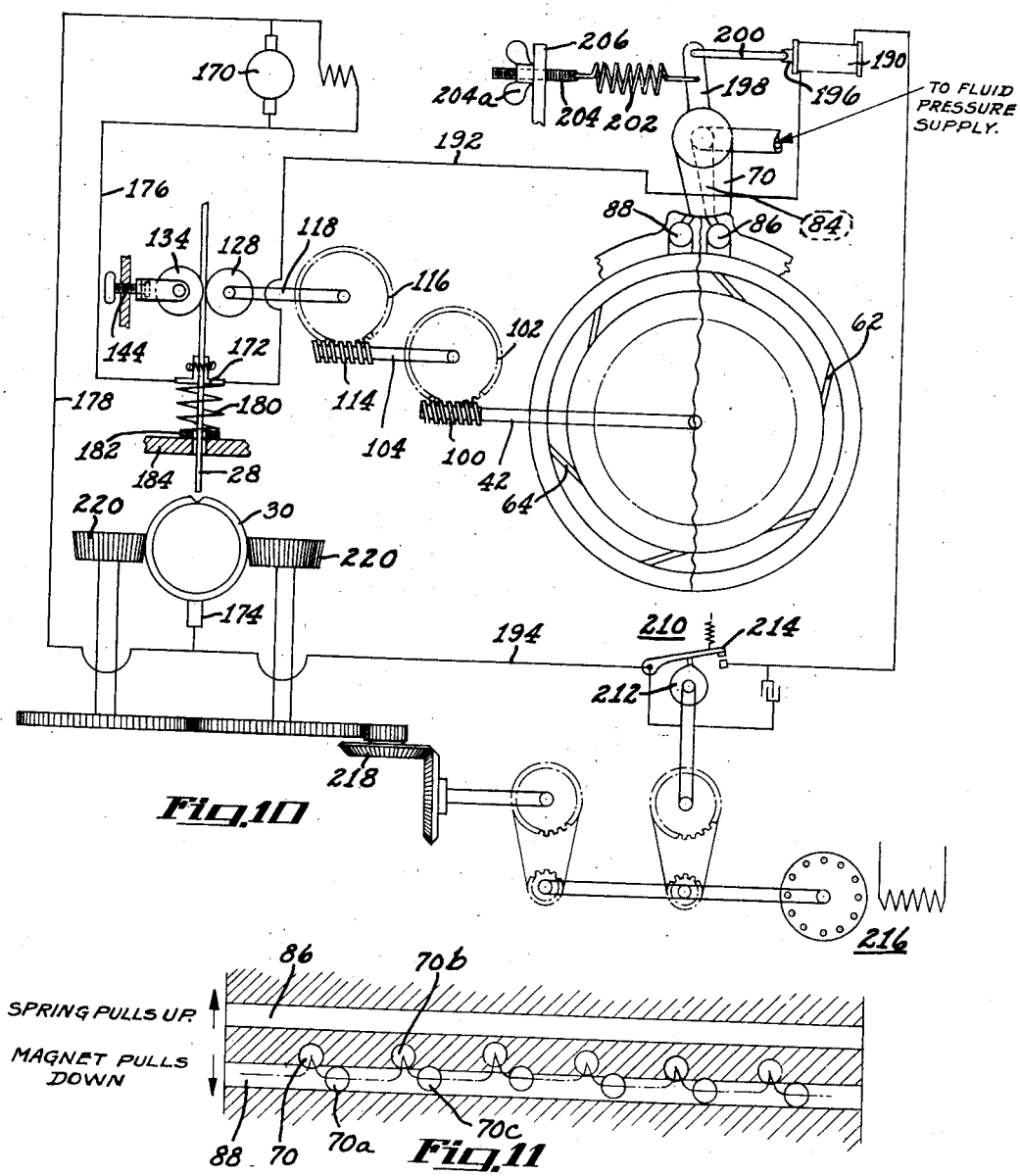
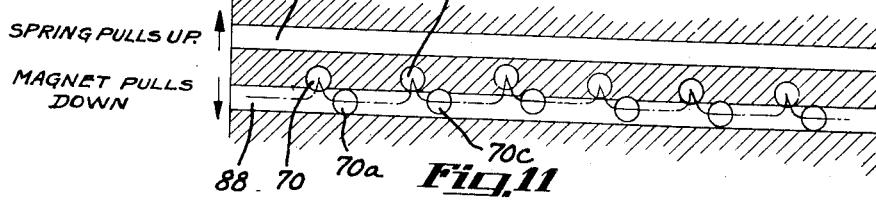
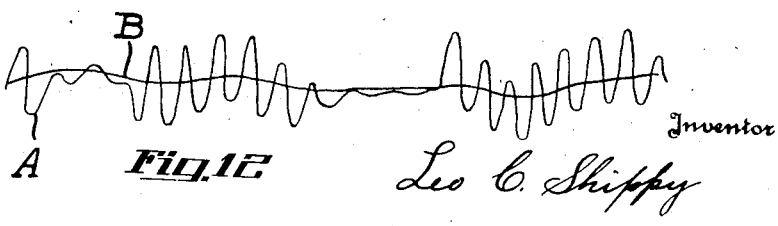
Inventor
Leo C. Shippy
By Spencer Hardman and Fehr
his Attorneys Patented Dec. 11, 1934

1,983,781

UNITED STATES PATENT OFFICE 1,983,781

CONTROL OF ARC WELDER HEAD

Leo C. Shippy, Anderson, Ind., assignor, by mesne assignments, to General Motors Corporation, Detroit, Mich., a corporation of Delaware Application June 20, 1932, Serial No. 618,207

40 Claims. (Cl. 219—8)

This invention relates to a metal arc welding apparatus and more particularly to the control of the electrode feeding device in the arc welding head of the apparatus.

In the various types of conventional arc welding heads where the prime mover for the electrode feeding device is controlled by the arc current, almost constant hunting of the electrode has been noticed which is most disadvantageous for the quality of the welding. While the prime mover can be commonly said to be responsive to the arc current, yet the necessary fine degree of response has not been obtained, largely due to the unavoidable friction in the control mechanism of the prime mover and the prime mover itself.

It is among the objects of the present invention to overcome this disadvantage by periodically interrupting the influence of the prime mover control which is responsive to the arc current, thereby preventing undue acceleration of the prime mover and the moving parts of the feeding device.

Further objects and advantages of the present invention will be apparent from the following description, reference being had to the accompanying drawings wherein a preferred embodiment of one form of the present invention is clearly shown.

In the drawings:

Fig. 1 is a side elevation of a welding head of the Good-speed type.

Fig. 2 is a front elevation of the welding head, certain parts being shown in section for better disclosure.

Fig. 3 is a top view of the welding head with certain parts being shown in section.

Fig. 8 is a detail view of the bucket wheel of the fluid motor and shows the disposition of the two sets of buckets thereof.

Fig. 9 is a sectional view taken on the line 9—9 of Fig. 8.

Fig. 10 is a diagrammatic illustration of the welding head and certain other elements which together embody the present invention.

Fig. 11 is a diagrammatic illustration of the characteristics of the novel welding head control.

Fig. 12 is a comparative chart illustrating the electrode movement with the conventional and the novel control of the electrode feeding device.

Figure 4:
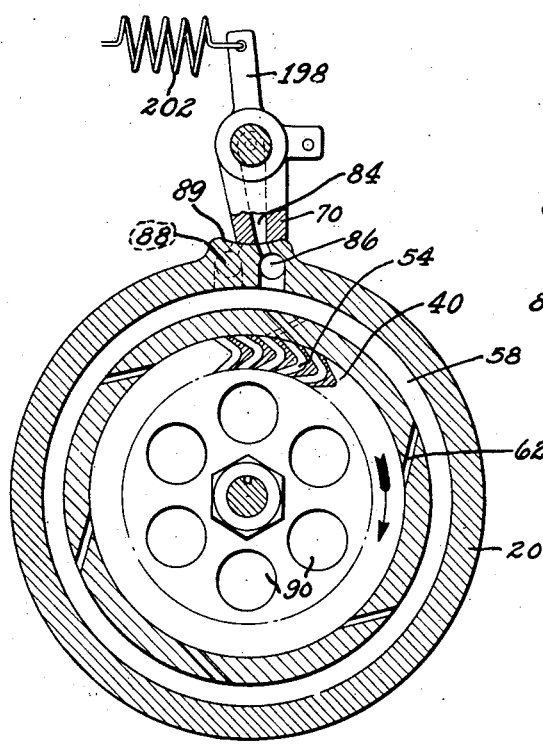
Fig. 4 is a sectional view taken on the line 4—4 of Fig. 5, and shows one set of buckets of the bucket wheel of the fluid motor.

Referring to the drawings the reference numeral 20 represents an arc welder head providing a bearing 22 which together with a cap 24 is clamped to a cylindrical bar 26 of a workpiece supporting frame (not shown). The welder head 20 houses a device for feeding an electrode 28 toward and away from the workpiece 30, shown in the diagrammatic Fig. 10, and also the driving element for the feeding device.

Driving element for feeding device

Figure 5:
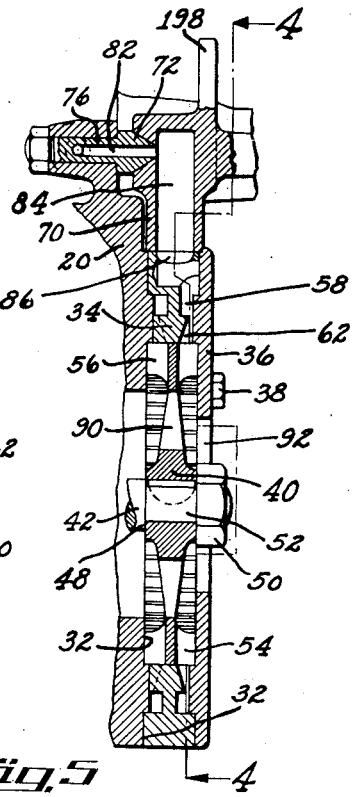
Fig. 5 is a fragmentary sectional view taken substantially along the line 5—5 of Fig. 3.
Figure 6:
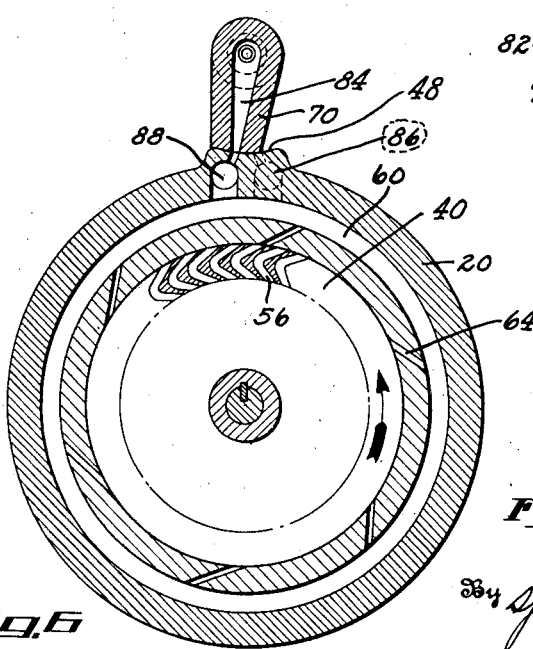
Fig. 6 is a sectional view taken on the line 6—6 of Fig. 7, and shows the other set of buckets of the bucket wheel of the fluid motor.
Figure 7:
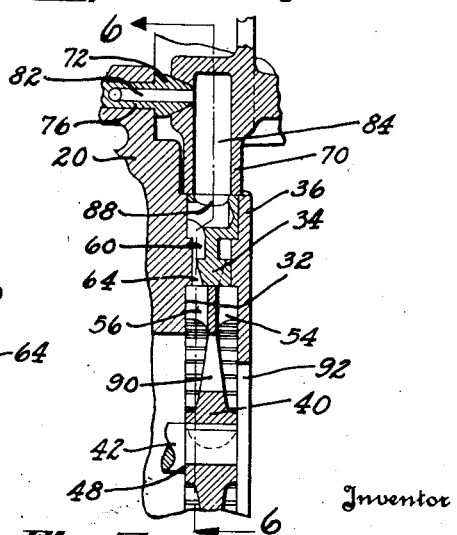
Fig. 7 is a fragmentary sectional view similar to Fig. 5.

The welder head 20 is provided with a finished surface 32 against which a fluid distributor 34 is resting as best shown in Figs. 2, 5 and 7. A plate 36 is secured to the welder head 20 by screws 38 and maintains the fluid distributor in firm engagement with the finished surface 32 of the welder head 20. A bucket wheel 40 is keyed to a shaft 42 journaled in ball bearings 44 and 46 provided by the welder head 20 and held in engagement with a shoulder 48 by a nut 50, which is received by the threaded end 52 of the shaft 42. The bucket wheel 40 comprises two sets of buckets 54 and 56 for rotation of the bucket wheel in either direction when impinged upon by any suitable fluid such as compressed air for instance. The fluid distributor 34 provides two annular separated chambers 58 and 60 and equally spaced grooves 62 and 64, providing communication between the annular chamber 58 and the set of buckets 54, and between the annular chamber 60 and the set of buckets 56, respectively. The grooves 62 are adapted to guide fluid in the chambers 58 and 60 in a proper direction toward the buckets of the wheel 40 in order to obtain a favorable impingement of fluid upon the bucket. A nozzle 70 is pivotally supported by the tapered ends 72 and 74 of stems 76 and 78, respectively, mounted in an arm 80 of the welder head 20. The stem 76 has a central duct 82 which provides communication between a supply of compressed fluid (not shown) and a recess 84 provided by the nozzle 70. The open end of this nozzle is slidable along a curved finished surface of the fluid distributor 34, said surface being a true circular arc about the center of rotation of the nozzle 70 as best disclosed in Figs. 4 and 6. Ducts 86 and 88, providing communication between the curved surface 48 and the annular chambers 58 and 60, respectively admit fluid from the fluid supply to either chamber, depending upon the alignment of the recess 84 of the nozzle with one of said ducts 86 and 88. When the recess 84 of the nozzle is out of communication with either duct, no fluid from the nozzle can escape due to the intercepting curved surface 89 of the fluid distributor. The fluid, after having passed the buckets may escape through apertures 90 in the bucket wheel 40 and an aperture 92 in the plate 36. In the present instance compressed air has been chosen as operating fluid, it being understood, however, that any other fluid could be successfully substituted for compressed air.

Electrode feeding device

Referring more particularly to Figs. 1, 2 and 3 the shaft 42 carries a worm 100 meshing with a worm gear 102 fixed to a shaft 104 which is journaled in ball bearings 106 and 108 located in annular bosses 110 and 112, respectively, of the welder head 20. Fixed to the same shaft 104 is a worm 114 which meshes with a worm gear 116 on a shaft 118 journaled in ball bearings 120 and 122 located in annular bosses 124 and 126, respectively, of the welder head 20. The train of worm gearing 100, 102, 114, 116 reduces the speed of the fluid motor shaft 42. The end of the shaft 118 which extends beyond the welder head receives a feed roller 128 of hardened steel which is maintained in firm engagement with a shoulder 130 of the shaft 118 by a nut 132 threaded upon the end of shaft 118. Cooperating with the feed roller 128 is another roller 134 of hardened steel which is pivoted to an L-shaped slide 136, resting on a finished surface 138 of the welder head 20 and guided for movement toward and away from the feed roller 128 by a guide member 140 which is secured to said finished surface 138 by screws 142. A screw 144 having a knob 146 is threaded through the guide member 140 and provides an annular shoulder 148 which is received within an annular recess 150 of the slide 136. A centrally apertured plate, secured to the slide by screw 152 maintains the shoulder 148 of the screw 144 within the recess 150. Rotation of the screw results in movement of the slide 136 in the guide 140 toward and away from the feed roller 128, depending upon the direction of rotation of the screw 144, and makes thus possible adjustment of the feed roller 134 to any size electrode relative to the stationary feed roller 128. The welder head 20 also provides a bearing 160 cooperating with a cap 162 and screws 164 for clamping a tubular electrode guide 166 of insulating material to the welder head. This guide assures that the electrode is always in alignment with the feed rollers 128, 134.

Electric welding circuit

Referring to Fig. 10, any suitable source of electric power such as a D. C. generator 170 is shown conductively connected with a wiping contact 172 on the electrode 28 and a conductive work support 174 by lead wires 176 and 178, respectively. The wiping contact 172 is held stationary relative to the movable electrode 28 by a spring 180, interposed between said wiping contact and an insulating washer 182 on a platform 184 of a bracket 186 secured to the welder head 20 by screws 188. The welding circuit is closed whenever an arc bridges the air gap between the electrode and the welding point on the workpiece 30.

Control of driving element for feeding device

A solenoid 190 is connected in shunt with the wiping contact 172 on the electrode and the conductive work support 174 by lead wires 192 and 194, respectively. The core 196 is connected with an arm 198 of the nozzle 70 by a link 200, adapted to transmit motion of the solenoid core to the nozzle and vice versa. A spring 202 is hooked to the arm 198 of the nozzle 70 and fastened to a screw 204 which is threaded through a projection 206 of the welder head 20. A wing nut 204a permits longitudinal adjustment of the screw 204 and therewith of the spring 202 to any desirable tension. In the present instance the solenoid is adapted to shift the nozzle 70 into communication with the duct 88 so as to rotate the bucket wheel 40 in a direction which results in a movement of the electrode 28 toward the welding point on the workpiece 30 while the spring 202 tends to shift the nozzle into communication with the other duct 86 for effecting movement of the electrode away from the welding point. Suppose the arc gap between the welding point of the workpiece and the continuously fed electrode end which melts away at the same rate at which the electrode is fed is a proper one, a certain amount of the entire current produced by the generator 170 then bridges the air gap between the electrode and the welding point on the workpiece in the form of an arc, while the remaining current energizes the solenoid 190. The ampere-turns of the solenoid have been so selected that an electromagnetic field is produced which is strong enough to counterbalance the tension of the spring 202 so that under the supposed conditions the nozzle communicates with duct 88 to such an extent that the electrode is fed at the same rate at which the end of the same melts away. When the arc gap becomes greater due to slight irregularities in the welding seam of the workpiece its resistance increases and less current than before bridges this gap. The current which now energizes the solenoid increases according to well known principles and produces a stronger magnetic field which now overcomes the spring 202 and shifts the nozzle further into communication with duct 88 thereby effecting a feeding movement of the electrode toward the workpiece which exceeds the rate at which the electrode end melts away until the proper arc gap is obtained again when the nozzle returns to the proper communicating position as follows from the preceding. When the arc gap becomes smaller than desired its resistance decreases and more current bridges this gap. The current now energizing the solenoid decreases as can be readily understood from the foregoing and the magnetic field of the solenoid therefore weakens which enables the spring to shift the nozzle into communication with duct 86 thereby effecting a movement of the electrode away from the work-piece until the proper arc gap is obtained again.

Device to prevent surging or hunting of electrode

A circuit breaker unit 210 comprising a rotary cam 212 and a breaker lever 214 is connected in series with the solenoid. The cam 212 is rotated by a driving element 216 such as a motor for instance, which also may drive the generator 170 and a train of speed reducing gears 218 which drive work-piece feeding rollers 220. The circuit breaker 210 continuously interrupts the energizing current of the solenoid so that only impulses of current flow through the ampere windings of the solenoid. The resulting magnetic field therefore changes alternately. The solenoid core due to its relatively great mass and frictional support naturally does not reciprocate entirely in response to the change of the magnetic field but will be influenced to the effect that the solenoid core slowly responds to the change of magnetic field, which slow response is composed of unnoticeable steps of movement of the solenoid core. From this it follows that the solenoid core cannot obtain sufficient acceleration which, when transmitted to the nozzle 70 would lead to an undesirable acceleration. Continuous searching or hunting of the electrode would be the result because the solenoid is very sensitive with respect to variation of the arc gap which changes continuously during a welding process. It is therefore apparent that with the introduction of the circuit breaker in the solenoid energizing circuit the above described disadvantages are successfully overcome and a most sensitive control over the electrode feeding device has been accomplished, which results in a most uniform weld and hence in a weld of highest quality.

Fig. 11 shows the characteristic of the novel nozzle control. The reference numeral 70 designates the mouth of the nozzle which may communicate with either fluid entry duct 86 or 88. While the nozzle is in position 70a, the solenoid is energized by a certain amount of current in the shunt circuit. Subsequently the circuit breaker interrupts the energizing current of the solenoid whereupon the spring tends to shift the nozzle into communication with fluid entry duct 86 but reaches only position 70b at which time the solenoid energizing circuit is restored whereupon the solenoid shifts the nozzle from position 70b to position 70c, i. e. into communication with fluid entry duct 88 again. This process repeats itself as often as the circuit breaker interrupts the shunt circuit. The relative nozzle positions 70, 70a and 70b, 70c etc. will naturally shift between the entry ducts 86 and 88 in response to variation of the arc current as will be readily understood.

Fig. 12 is a chart wherein comparison may be had between the electrode movement with the conventional and the novel control of the feeding device. The rapidly fluctuating line A represents the electrode movement without the shunt circuit breaker. The slightest change in the arc current results in violent fluctuations of the electrode which is not given nearly sufficient time to come to a state of equilibrium before the arc current changes again and effects new fluctuations of the electrode. The comparatively smooth curve B represents the movement of the electrode with the circuit breaker in the shunt circuit. No noticeable fluctuations of the electrode take place because the solenoid is not energized long enough sufficiently to accelerate the electrode to give rise to appreciable fluctuations due to the continuous interruption of the solenoid energizing current.

It is to be understood that the application of A. C. current in the welding circuit does not influence the described functions of the solenoid in combination with the circuit breaker.

It is also to be understood that the present arc control which is primarily useful in metal arc welding as follows from the preceding can also be successfully used in carbon arc welding by merely performing some minor adjustment of the magnetic field of the solenoid or of the spring opposite the solenoid.

While the form of embodiment of the present invention as herein disclosed, constitutes a preferred form, it is to be understood that other forms might be adopted, all coming within the scope of the claims which follow.

What is claimed is as follows:

1. In an arc welding apparatus the combination of, an electrode, a source of electric power connected with the electrode and a workpiece; a device for feeding the electrode toward and away from workpiece; means for operating the feeding device; an instrumentality constantly tending to cause the operating means to operate the feeding device in a direction to withdraw the electrode from the workpiece; a second instrumentality tending to cause the operating means to operate the feeding device in a direction to advance the electrode in response to variation of the arc current; and means for periodically interrupting the influence of the second instrumentality.

2. In an arc welding apparatus the combination of, an electrode; a source of electric power connected with the electrode and a workpiece; a device for feeding the electrode toward and away from workpiece; means for operating the feeding device; control means including a spring tending to cause the operating means to operate the feeding device in a direction to withdraw the electrode, an electromagnet in shunt with the arc current and tending to cause the operating means to operate the feeding means in a direction to advance the electrode toward the workpiece, and means for periodically interrupting the circuit of the electromagnet.

3. In an arc welding apparatus the combination of, an electrode; a device for feeding the electrode toward and away from a workpiece; a fluid pressure operated rotor having two sets of oppositely disposed buckets for rotating the rotor in either direction, said rotor actuating the feeding device; means for supplying compressed fluid; a nozzle permanently communicating with the fluid supplying means and shiftable into communication with either set of buckets of the rotor; a source of electric power connected with the electrode and the workpiece; means for controlling the shifting of the nozzle into communication with either set of buckets of the rotor in response to variation of the arc current from a predetermined value; and means for alternatingly interrupting the operation of the last said means, thereby effecting a step by step shifting of the nozzle.

4. In an arc welding apparatus the combination of, an electrode; a device for feeding the electrode toward and away from a workpiece; a fluid pressure operated rotor having two sets of oppositely disposed buckets for rotating the rotor in either direction, said rotor actuating the feeding device; means for supplying compressed fluid; a nozzle permanently communicating with the fluid supplying means and shiftable into communication with either set of buckets of the rotor; a source of electric power connected with the electrode and the workpiece; means for shifting the nozzle into communication with one set of buckets of the rotor and for controlling the shifting of the nozzle into communication with the other set of buckets of the rotor in response to variation of the arc current from a predetermined value; a spring for shifting the nozzle into communication with said other set of buckets of the rotor; and means for alternatingly interrupting the operation of the last said means, thereby effecting a step by step shifting of the nozzle.

5. In an arc welding apparatus the combination of, an electrode; a device for feeding the electrode toward and away from a workpiece; a fluid pressure operated rotor having two sets of oppositely disposed buckets for rotating the rotor in either direction, said rotor actuating the feeding device; means for supplying compressed fluid; a nozzle permanently communicating with the fluid supplying means and shiftable into communication with either set of buckets of the rotor; a source of electric power connected with the electrode and the workpiece; electric means for controlling the shifting of the nozzle into communication with either set of buckets of the rotor in response to deviation of the arc gap from a predetermined gap; and means for periodically interrupting the controlling influence of the electric means thereby effecting a step by step shifting of the nozzle.

6. In an arc welding apparatus the combination of, an electrode; a device for feeding the electrode toward and away from a workpiece; a fluid pressure operated rotor having two sets of oppositely disposed buckets for rotating the rotor in either direction, said rotor actuating the feeding device; means for supplying compressed fluid; a nozzle permanently communcating with the fluid supplying means and shiftable into communication with either set of buckets of the rotor; a source of electric power connected with the electrode and the workpiece; electric means for shifting the nozzle into communication with one set of buckets of the rotor and for controlling the shifting of the nozzle into communication with the other set of buckets of the rotor in response to deviation of the arc gap from a predetermined gap; a spring for shifting the nozzle into communication with said other set of buckets of the rotor; and means for periodically interrupting the operation of the electric means thereby effecting a step by step shifting of the nozzle.

7. In an arc welding apparatus the combination of, an electrode; a device for feeding the electrode toward and away from a workpiece; a fluid pressure operated rotor having two sets of oppositely disposed buckets for rotating the rotor in either direction, said rotor actuating the feeding device; means for supplying compressed fluid; a nozzle permanently communicating with the fluid supplying means and shiftable into communication with either set of buckets of the rotor; a source of electric power connected with the electrode and the workpiece; electric means for controlling the shifting of the nozzle into communication with either set of buckets of the rotor in response to deviation of the arc gap from a predetermined gap; a circuit breaker connected in series with said electric means for alternatingly interrupting the controlling influence of said electric means thereby effecting a step by step shifting of the nozzle; and a driving element for the circuit breaker.

8. In an arc welding apparatus the combination of, an electrode; a device for feeding the electrode toward and away from a workpiece; a fluid pressure operated rotor having two sets of oppositely disposed buckets for rotating the rotor in either direction, said rotor actuating the feeding device; means for supplying compressed fluid; a nozzle permanently communicating with the fluid supplying means and shiftable into communication with either set of buckets of the rotor; a source of electric power connected with the electrode and the workpiece; electric means for shifting the nozzle into communication with one set of buckets of the rotor and for controlling the shifting of the nozzle into communication with the other set of buckets of the rotor in response to deviation of the arc gap from a predetermined gap; a spring for shifting the nozzle into communication with said other set of buckets of the rotor; a circuit breaker connected in series with the electric means for alternatingly interrupting the operation of said electric means, thereby effecting a step by step shifting of the nozzle; and a driving element for the circuit breaker.

9. In an arc welding apparatus the combination of, an electrode; a device for feeding the electrode toward and away from the workpiece; a fluid pressure operated rotor having two sets of oppositely disposed buckets for rotating the rotor in either direction, said rotor actuating the feeding device; means for supplying compressed fluid; a nozzle permanently communicating with the fluid supplying means and shiftable into communication with either set of buckets of the rotor; a source of electric power connected with the electrode and the workpiece; means including a solenoid for shifting the nozzle into communication with either set of buckets of the rotor, said means being responsive to a variation of the arc current from a predetermined value; a circuit breaker connected in series with the solenoid for alternatingly interrupting the influence of the solenoid, thereby effecting a step by step shifting of the nozzle; and a driving element for the circuit breaker.

10. In an arc welding apparatus the combination of, an electrode; a device for feeding the electrode toward and away from a workpiece; a fluid pressure operated rotor having two sets of oppositely disposed buckets for rotating the rotor in either direction, said rotor actuating the feeding device; means for supplying compressed fluid; a nozzle permanently communicating with the fluid supplying means and shiftable into communication with either set of buckets of the rotor; a source of electric power connected with the electrode and the workpiece; a solenoid responsive to variation of the arc current from a predetermined value for shifting the nozzle into communication with one set of buckets of the rotor and for controlling the shifting of the nozzle into communication with the other set of buckets of the rotor; a spring for shifting the nozzle into communication with said other set of buckets of the rotor; a circuit breaker connected in series with the solenoid for alternatingly interrupting the operation of the solenoid thereby effecting a step by step shifting of the nozzle; and a driving element for the circuit breaker.

11. In an arc welding apparatus the combination of, an electrode; a welding circuit comprising a source of electric power connected with the electrode and a workpiece; a device for feeding the electrode toward and away from the workpiece; a fluid pressure operated rotor having two sets of oppositely disposed buckets for rotating the rotor in either direction, said rotor actuating the feeding device; means for supplying compressed fluid; a fluid distributing nozzle permanently communicating with the fluid supplying means and shiftable into communication with either set of buckets of the rotor; electric means connected in shunt with the welding circuit for controlling the shifting of the nozzle into communication with either set of buckets of the rotor; and means for periodically opening the shunt circuit thereby effecting a step by step shifting of the nozzle.

12. In an arc welding apparatus the combination of, an electrode; a welding circuit comprising a source of electric power connected with the electrode and a workpiece; a device for feeding the electrode toward and away from the workpiece; a fluid pressure operated rotor having two sets of oppositely disposed buckets for rotating the rotor in either direction, said rotor actuating the feeding device; means for supplying compressed fluid; a fluid distributing nozzle permanently communicating with the fluid supplying means and shiftable into communication with either set of buckets of the rotor; electric means connected in shunt with the welding circuit for controlling the shifting of the nozzle into communication with either set of buckets of the rotor; and means connected in series with said electric means for periodically opening the shunt circuit thereby effecting a step by step shifting of the nozzle.

13. In an arc welding apparatus the combination of, an electrode; a welding circuit comprising a source of electric power connected with the electrode and a workpiece; a device for feeding the electrode toward and away from the workpiece; a fluid pressure operated rotor having two sets of oppositely disposed buckets for rotating the rotor in either direction, said rotor actuating the feeding device; means for supplying compressed fluid; a fluid distributing nozzle permanently communicating with the fluid supplying means and shiftable into communication with either set of buckets of the rotor; electric means connected in shunt with the welding circuit for controlling the shifting of the nozzle into communication with either set of buckets of the rotor; a circuit breaker connected in series with said electric means for alternatingly opening the shunt circuit, thereby effecting a step by step shifting of the nozzle; and a driving element for the circuit breaker.

14. In an arc welding apparatus the combination of, an electrode; a welding circuit comprising a source of electric power connected with the electrode and a workpiece; a device for feeding the electrode toward and away from the workpiece; a fluid pressure operated rotor having two sets of oppositely disposed buckets for rotating the rotor in either direction, said rotor actuating the feeding device; means for supplying compressed fluid; a fluid distributing nozzle permanently communicating with the fluid supplying means and shiftable into communication with either set of buckets of the rotor; a solenoid connected in shunt with the welding circuit for controlling the shifting of the nozzle into communication with either set of buckets of the rotor; and means connected in series with the solenoid for periodically opening the shunt circuit, thereby effecting a step by step shifting of the nozzle.

15. In an arc welding apparatus the combination of, an electrode; a welding circuit comprising a source of electric power connected with the electrode and a workpiece; a device for feeding the electrode toward and away from the workpiece; a fluid pressure operated rotor having two sets of oppositely disposed buckets for rotating the rotor in either direction, said rotor actuating the feeding device; means for supplying compressed fluid; a fluid distributing nozzle permanently communicating with the fluid supplying means and shiftable into communication with either set of buckets of the rotor; a solenoid connected in shunt with the welding circuit for controlling the shifting of the nozzle into communication with either set of buckets of the rotor; a circuit breaker connected in series with the solenoid for alternatingly opening the shunt circuit thereby effecting a step by step shifting of the nozzle; and a driving element for the circuit breaker.

16. In an arc welding apparatus the combination of, an electrode; a welding circuit comprising a source of electric power connected with the electrode and a workpiece; a device for feeding the electrode toward and away from the workpiece; a fluid pressure operated rotor having two sets of oppositely disposed buckets for rotating the rotor in either direction, said rotor actuating the feeding device; means for supplying compressed fluid; a fluid distributing nozzle permanently communicating with the fluid supplying means and shiftable into communication with either set of buckets of the rotor; a solenoid connected in shunt with the welding circuit for shifting the nozzle into communication with one set of buckets of the rotor and for controlling the shifting of the nozzle into communication with the other set of buckets of the rotor; a spring urging the nozzle into communication with said other set of buckets of the rotor; and means connected in series with the solenoid for alternatingly opening the shunt circuit, thereby effecting a step by step shifting of the nozzle into communication with either rotor.

17. In an arc welding apparatus the combination of, an electrode; a welding circuit comprising a source of electric power connected with the electrode and a workpiece; a device for feeding the electrode toward and away from the workpiece; a fluid pressure operated rotor having two sets of oppositely disposed buckets for rotating the rotor in either direction, said rotor actuating the feeding device; means for supplying compressed fluid; a fluid distributing nozzle permanently communicating with the fluid supplying means and shiftable into communication with either set of buckets of the rotor; a solenoid connected in shunt with the welding circuit for shifting the nozzle into communication with one set of buckets of the rotor and for controlling the shifting of the nozzle into communication with the other set of buckets of the rotor; a spring urging the nozzle into communication with said other set of buckets of the rotor; a circuit breaker connected in series with the solenoid for alternatingly opening the shunt circuit thereby effecting a step by step shifting of the nozzle; and a driving element for the circuit breaker.

18. In an arc welding apparatus, the combination of an electrode; a device for feeding the electrode toward the workpiece; means for causing the feeding device to feed the electrode at a rate varying with the gap between the electrode and the workpiece; and means for periodically interrupting the operation of said first means.

19. In an arc welding apparatus, the combination of an electrode; a device for feeding the electrode toward a workpiece; a prime mover for operating the feeding device; means for causing the prime mover to operate the feeding device to feed the electrode at a rate varying with the gap between the electrode and the workpiece; and means periodically tending to cause the prime mover to operate at a slower rate.

20. In an arc welding apparatus, the combination of an electrode; a device for feeding the electrode toward a workpiece; a prime mover for operating the feeding device; means for controlling the delivery of a power medium to the prime mover in order that the feeding device will be operated at a rate varying with the gap between the electrode and the workpiece; and means periodically causing the controlling means to reduce the amount of power medium delivered to the prime mover.

21. In an arc welding apparatus, the combination of an electrode; a device for feeding the electrode toward a workpiece; a fluid pressure operated motor; means for controlling the delivery of pressure fluid to the motor in order that the feeding device will be operated at a rate varying with the gap between the electrode and the workpiece; and means periodically causing the controlling means to reduce the amount of fluid pressure delivered to the motor.

22. In an arc welding apparatus, the combination of an electrode; a device for feeding the electrode toward a workpiece; a prime mover for operating the feeding device; electric means for controlling the delivery of a power medium to the prime mover; and means for periodically imposing upon the electric means an electromotive force varying with the gap between the electrode and the workpiece.

23. In an arc welding apparatus, the combination of an electrode; a device for feeding the electrode toward a workpiece; a prime mover for operating the feeding device; electric means for controlling the delivery of a power medium to the prime mover; means for imposing upon the electric means an electromotive force varying with the gap between the electrode and the workpiece; and means for periodically interrupting the imposition of the electromotive force upon the electric means.

24. In an arc welding apparatus, the combination of an electrode; a device for feeding the electrode toward a workpiece; means for causing the feeding device to feed the electrode at a rate responsive to variation of the arc current; and means for periodically interrupting the operation of the first mentioned means.

25. In an arc welding apparatus, the combination of an electrode; a device for feeding the electrode toward a workpiece; a prime mover for operating the feeding device; means for causing the prime mover to operate the feeding device to feed the electrode at a rate responsive to variation of the arc current; and means periodically tending to cause the prime mover to operate at a slower rate.

26. In an arc welding apparatus, the combination of an electrode; a device for feeding the electrode toward a workpiece; a prime mover for operating the feeding device; means for controlling the delivery of a power medium to the prime mover in order that the feeding device will be operated at a rate responsive to variation of the arc current; and means periodically causing the controlling means to reduce the amount of power medium delivered to the prime mover.

27. In an arc welding apparatus, the combination of an electrode; a device for feeding the electrode toward a workpiece; a fluid pressure operated motor; means for controlling the delivery of fluid pressure to the motor in order that the feeding device will be operated at a rate responsive to variation of the arc current; and means periodically causing the controlling means to reduce the amount of fluid pressure delivered to the motor.

28. In an arc welding apparatus, the combination of an electrode; a device for feeding the electrode toward a workpiece; a prime mover for operating the feeding device; electric means for controlling the delivery of a power medium to the prime mover; and means for periodically imposing upon the electric means an electromotive force the value of which is responsive to variation of the arc current.

29. In an arc welding apparatus, the combination of an electrode; a device for feeding the electrode toward a workpiece; a prime mover for operating the feeding device; electric means for controlling the delivery of a power medium to the prime mover; means for imposing upon the electric means an electromotive force the value of which is responsive to variation of the arc current; and means for periodically interrupting the imposition of the electromotive force upon the electric means.

30. In an arc welding apparatus the combination of an electrode; a mechanism for feeding a workpiece past the electrode; a device for feeding the electrode toward the workpiece; means for causing the feeding device to feed the electrode at a rate varying with the gap between the electrode and the workpiece; and means for periodically interrupting the operation of the first mentioned means synchronous to the feeding speed of the mechanism.

31. In an arc welding apparatus the combination of an electrode; a mechanism for feeding a workpiece past the electrode; a device for feeding the electrode toward the workpiece; means for causing the feeding device to feed the electrode at a rate varying with the gap between the electrode and the workpiece; and means operated by the mechanism for periodically interrupting the operation of the first mentioned means synchronous to the feeding speed of the mechanism.

32. In an arc welding apparatus, the combination of an electrode; a mechanism for feeding a workpiece past the electrode; a device for feeding the electrode toward a workpiece; a prime mover for operating the feeding device; a controller for causing the prime mover to operate the feeding device to feed the electrode at a rate varying with the gap between the electrode and the workpiece; and means operated in synchronism with the feeding speed of the mechanism for periodically tending to cause the prime mover to operate at a slower rate.

33. In an arc welding apparatus, the combination of an electrode; a mechanism for feeding a workpiece past the electrode; a device for feeding the electrode toward the workpiece; a prime mover for operating the feeding device; means for controlling the delivery of a power medium to the prime mover in order that the feeding device will be operated at a rate varying with the gap between the electrode and the workpiece; and means operated in synchronism with the feeding speed of the mechanism for periodically causing the controlling means to reduce the amount of power medium delivered to the prime mover.

34. In an arc welding apparatus, the combination of an electrode; a mechanism for feeding a workpiece past the electrode; a device for feeding the electrode toward a workpiece; a fluid pressure operated motor; means for controlling the delivery of fluid pressure to the motor in order that the feeding device will be operated at a rate varying with the gap between the electrode and the workpiece; and means operated in synchronism with the feeding speed of the mechanism for periodically causing the controlling means to reduce the amount of fluid pressure delivered to the motor.

35. In an arc welding apparatus, the combination of an electrode; a mechanism for feeding a workpiece past the electrode; a device for feeding the electrode toward the workpiece; a prime mover for operating the feeding device; electric means for controlling the delivery of a power medium to the prime mover; means for imposing upon the electric means an electromotive force varying with the gap between the electrode and the workpiece; and means operated in synchronism with the feeding speed of the mechanism for periodically interrupting the imposition of the electromotive force upon the electric means.

36. In an arc welding apparatus the combination of an electrode; a mechanism for feeding a workpiece past the electrode; a device for feeding the electrode toward the workpiece; means for causing the feeding device to feed the electrode at a rate responsive to variation of the arc current; and means for periodically interrupting the operation of the first mentioned means synchronous to the feeding speed of the mechanism.

37. In an arc welding apparatus, the combination of an electrode; a mechanism for feeding a workpiece past the electrode; a device for feeding the electrode toward a workpiece; a prime mover for operating the feeding device; a controller for causing the prime mover to operate the feeding device to feed the electrode at a rate responsive to variation of the arc current; and means operated in synchronism with the feeding speed of the mechanism for periodically tending to cause the prime mover to operate at a slower rate.

38. In an arc welding apparatus, the combination of an electrode; a mechanism for feeding a workpiece past the electrode; a device for feeding the electrode toward the workpiece; a prime mover for operating the feeding device; means for controlling the delivery of a power medium to the prime mover in order that the feeding device will be operated at a rate responsive to variation of the arc current; and means operated in synchronism with the feeding speed of the mechanism for periodically causing the controlling means to reduce the amount of power medium delivered to the prime mover.

39. In an arc welding apparatus, the combination of an electrode; a mechanism for feeding a workpiece past the electrode; a device for feeding the electrode toward a workpiece; a fluid pressure operated motor; means for controlling the delivery of fluid pressure to the motor in order that the feeding device will be operated at a rate responsive to variation of the arc current; and means operated in synchronism with the feeding speed of the mechanism for periodically causing the controlling means to reduce the amount of fluid pressure delivered to the motor.

40. In an arc welding apparatus, the combination of an electrode; a mechanism for feeding a workpiece past the electrode; a device for feeding the electrode toward the workpiece; a prime mover for operating the feeding device; electric means for controlling the delivery of a power medium to the prime mover; means for imposing upon the electric means an electromotive force the value of which is responsive to variation of the arc current; and means operated in synchronism with the feeding speed of the mechanism for periodically interrupting the imposition of the electromotive force upon the electric means.

LEO C. SHIPPY.